US012640458B2

(12) United States Patent
Chen

(10) Patent No.: US 12,640,458 B2
(45) Date of Patent: May 26, 2026

(54) ANTENNA MODULE AND FIXED BRACKET THEREOF

(71) Applicant: WISTRON NEWEB CORPORATION, Hsinchu (TW)

(72) Inventor: Yuan-Yu Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 50 days.

(21) Appl. No.: 19/007,692

(22) Filed: Jan. 2, 2025

(65) Prior Publication Data

US 2025/0286263 A1 Sep. 11, 2025

(30) Foreign Application Priority Data

Mar. 7, 2024 (TW) ................................ 113108261

(51) Int. Cl.
*H01Q 1/22* (2006.01)

(52) U.S. Cl.
CPC .................................... *H01Q 1/22* (2013.01)

(58) Field of Classification Search
CPC ........ H01Q 1/22; H01Q 1/1207; B25B 5/006; B25B 5/14; F16M 13/02; F16M 13/022; F16M 11/10; F16M 2200/024; H05K 5/10; H04N 5/64
See application file for complete search history.

(56) References Cited

U.S. PATENT DOCUMENTS 11,522,280 B2 * 12/2022 Bae .......................... H01Q 1/12
2025/0192414 A1 * 6/2025 Chiu .................... H01Q 1/1207

* cited by examiner

*Primary Examiner* — David E Lotter
(74) *Attorney, Agent, or Firm* — McClure, Qualey & Rodack, LLP

(57) ABSTRACT

An antenna module includes a fixed bracket and an antenna element. The fixed bracket includes a base and a clamping structure disposed on the base. The clamping structure includes a first clamping part, a first retaining wall, a second clamping part, and a second retaining wall. The first clamping part and the second clamping part are arranged along a straight line. A horizontal distance between the first clamping part and the straight line is not equal to a horizontal distance between the second clamping part and the straight line. A horizontal distance between the first retaining wall and the straight line is not equal to a horizontal distance between the second retaining wall and the straight line. The antenna element is detachably engaged with the first clamping part and the second clamping part.

15 Claims, 9 Drawing Sheets

ANTENNA MODULE AND FIXED BRACKET THEREOF

CROSS-REFERENCE TO RELATED PATENT APPLICATION

This application claims the benefit of priority to Taiwan Patent Application No. 113108261, filed on Mar. 7, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna module and a fixed bracket thereof, particularly to an antenna module and a fixed bracket thereof with a simple structure that can simultaneously meet the needs of fixation and assembly foolproof design.

BACKGROUND OF THE DISCLOSURE

Currently, the structures used to fix antennas inside electronic devices usually have a complex design, such that assembly errors are likely to occur. In addition, as the antenna size (such as length, width, or thickness) increases, the fixing structures of the antennas generally need to be designed as a large volume form to enhance the stability when the antenna is being fixed. However, the large volume fixing structure occupies considerable space inside the electronic device, which is disadvantageous to the arrangement of other components.

Therefore, one of the important issues to be solved in this field is to improve the structural design to overcome the above defects.

SUMMARY OF THE DISCLOSURE

The present disclosure provides an antenna module and a fixed bracket thereof to address problems in prior art regarding the complex design of antenna fixing structures that is disadvantageous for assembling.

To solve the above technical problems, one technical solution adopted by the present disclosure is to provide an antenna module, which includes a fixed bracket and an antenna element. The fixed bracket includes a base and a clamping structure disposed on the base. The clamping structure includes a first clamping part, a first retaining wall, a second clamping part, and a second retaining wall. The first clamping part and the second clamping part are arranged along a straight line. A horizontal distance between the first clamping part and the straight line is not equal to a horizontal distance between the second clamping part and the straight line. A horizontal distance between the first retaining wall and the straight line is not equal to a horizontal distance between the second retaining wall and the straight line. The antenna element is detachably engaged with the first clamping part and the second clamping part.

To solve the above technical problems, another technical solution adopted by the present disclosure is to provide a fixed bracket, which includes a base and a clamping structure disposed on the base. The clamping structure includes a first clamping part, a first retaining wall, a second clamping part, and a second retaining wall. The first clamping part and the second clamping part are arranged along a straight line. A horizontal distance between the first clamping part and the straight line is not equal to a horizontal distance between the second clamping part and the straight line. A horizontal distance between the first retaining wall and the straight line is not equal to a horizontal distance between the second retaining wall and the straight line.

One beneficial effect of the present disclosure is that the antenna module and the fixed bracket thereof provided by the present disclosure can fix the antenna element through clamping parts and retaining walls with simple structures, and can also use structural configurations as a foolproof design where the horizontal distance between the first clamping part and the straight line is not equal to the horizontal distance between the second clamping part and the straight line, and the horizontal distance between the first retaining wall and the straight line is not equal to the horizontal distance between the second retaining wall and the straight line, to achieve the effect of simplifying structure and easy assembly.

These and other aspects of the present disclosure will become apparent from the following description of the embodiment taken in conjunction with the following drawings and their captions, although variations and modifications therein may be affected without departing from the spirit and scope of the novel concepts of the present disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
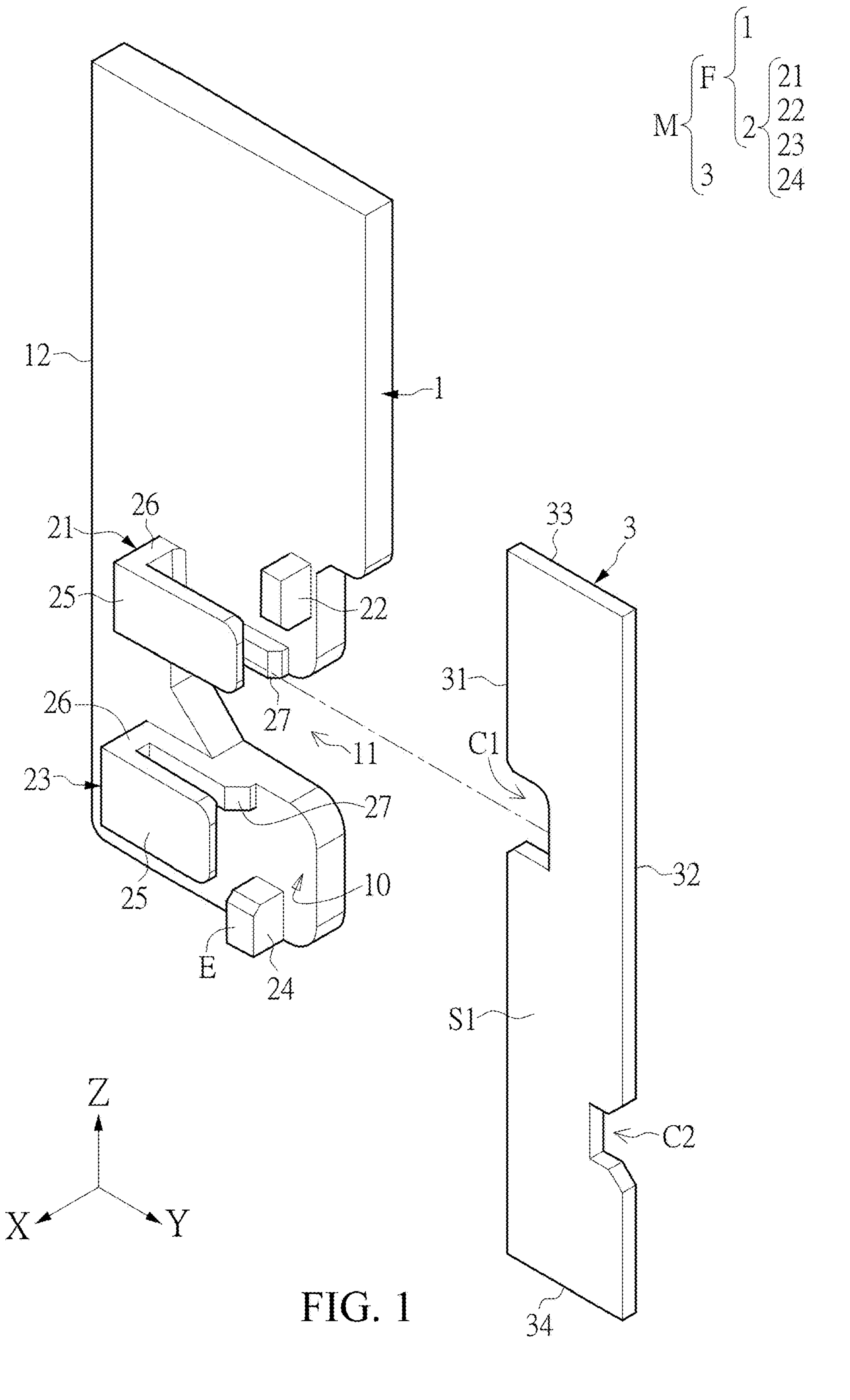
FIG. 1 is an exploded schematic view of a fixed bracket and an antenna element according to a first embodiment of the present disclosure.

The following content describes implementations of the present disclosure relating to "antenna module and fixed bracket thereof" through specific embodiments. The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like. Additionally, the term "or" used herein should be understood to mean that the associated listed items can be any one or more combinations thereof as appropriate. Moreover, the term "connect" in the present disclosure means that there is a physical connection between two elements, whether directly or indirectly connected.

Embodiments

Figure 2:
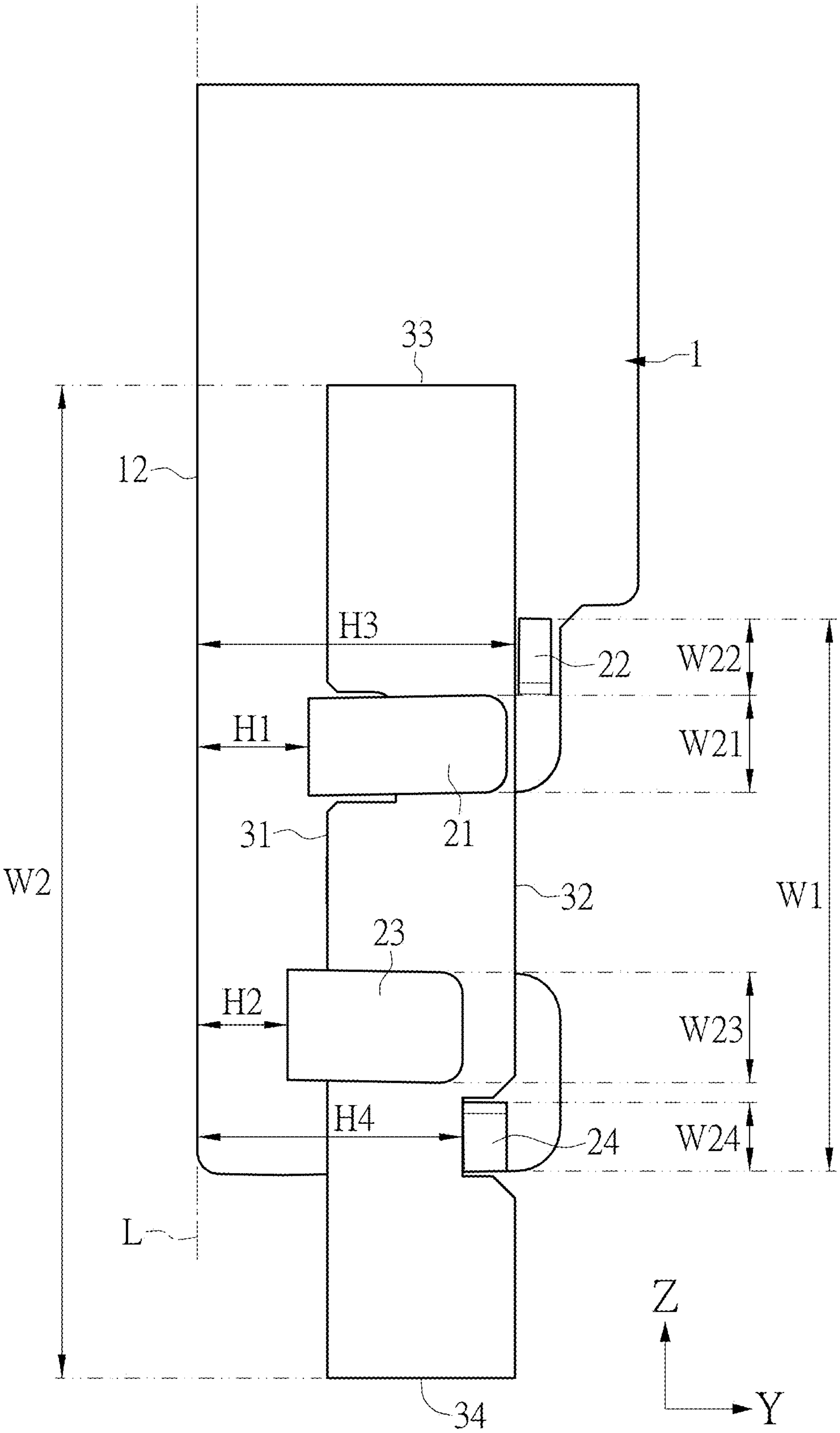
FIG. 2 is a front schematic view of the antenna element assembled on the fixed bracket according to the first embodiment of the present disclosure.
Figure 3:
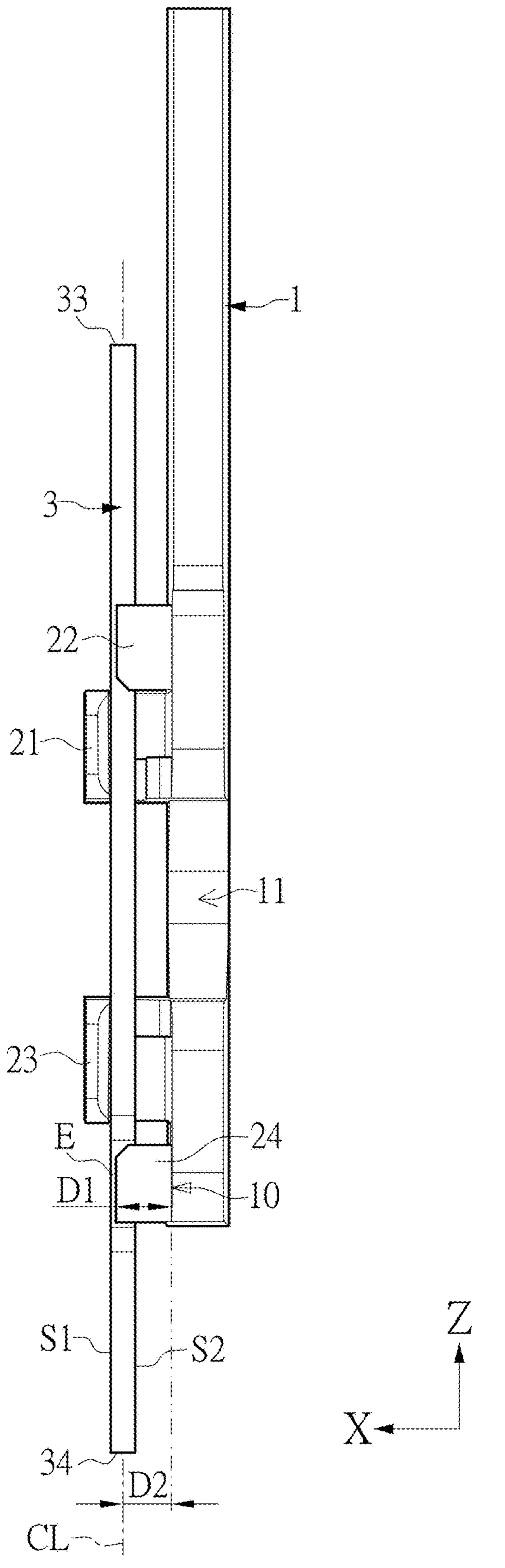
FIG. 3 is a side schematic view of the antenna element assembled on the fixed bracket according to the first embodiment of the present disclosure.

Refer to FIGS. 1 to 3, where FIG. 1 is an exploded schematic view of a fixed bracket and an antenna element according to a first embodiment of the present disclosure, FIG. 2 is a front schematic view of the antenna element assembled on the fixed bracket according to the first embodiment of the present disclosure, and FIG. 3 is a side schematic view of the antenna element assembled on the fixed bracket according to the first embodiment of the present disclosure. The present disclosure provides an antenna module M, which at least includes a fixed bracket F. The fixed bracket F includes a base 1 and a clamping structure 2 disposed on the base 1. The antenna module M also includes an antenna element 3, which can be fixed on the fixed bracket F. In the present disclosure, the antenna element 3 can be a PCB antenna, but the present disclosure is not limited to the specific form of the antenna element 3.

The clamping structure 2 includes a first clamping part 21, a first retaining wall 22, a second clamping part 23, and a second retaining wall 24. The first retaining wall 22 is adjacent to the first clamping part 21, and the second retaining wall 24 is adjacent to the second clamping part 23. The first clamping part 21 and the second clamping part 23 are arranged along a straight line L. The antenna element 3 is detachably engaged with the first clamping part 21 and the second clamping part 23.

For example, as shown in FIG. 2, the straight line L can be defined as a virtual line parallel to the Z-axis and aligned with a side 12 of the base 1. The first clamping part 21 is at a first horizontal distance H1 from the straight line L, and the second clamping part 23 is at a second horizontal distance H2 from the straight line L. The first horizontal distance H1 is not equal to the second horizontal distance H2. Preferably, the first horizontal distance H1 and the second horizontal distance H2 differ by at least 0.5 mm. In other words, the first clamping part 21 and the second clamping part 23 are arranged in a staggered configuration in the horizontal direction (i.e., the Y-axis direction).

Similarly, as shown in FIG. 2, the first retaining wall 22 is at a third horizontal distance H3 from the straight line L, and the second retaining wall 24 is at a fourth horizontal distance H4 from the straight line L. The third horizontal distance H3 is not equal to the fourth horizontal distance H4. Preferably, the third horizontal distance H3 and the fourth horizontal distance H4 differ by at least 0.5 mm. In other words, the first retaining wall 22 and the second retaining wall 24 are also arranged in a staggered configuration in the horizontal direction. The present disclosure uses the staggered configuration between the first clamping part 21 and the second clamping part 23, and the staggered configuration between the first retaining wall 22 and the second retaining wall 24 as a foolproof design, allowing the antenna element 3 to be assembled on the fixed bracket F in a fixed direction.

In addition, in the vertical direction (i.e., the Z-axis direction), the maximum distance between any two of the first clamping part 21, the second clamping part 23, the first retaining wall 22, and the second retaining wall 24 at least accounts for 55% of the maximum distance W2 between the third side 33 and the fourth side 34 of the antenna element 3. As shown in FIG. 2, the maximum distance W1 between any two of the first clamping part 21, the second clamping part 23, the first retaining wall 22, and the second retaining wall 24 is the vertical distance between the first retaining wall 22 and the second retaining wall 24, and the maximum distance W1 at least accounts for 55% of the maximum length, which is the maximum distance W2 between the third side 33 and the fourth side 34, of the antenna element 3. In prior art, the size of the hook structure used to fix objects generally needs to account for 80% or more of the object size to achieve stable clamping. The present disclosure can effectively stabilize the clamping of the antenna element 3 by designing the maximum distance between any two of the two clamping parts and the two retaining walls to account for at least 55% of the maximum length of the antenna element 3. Furthermore, compared to the existing hook structure, the clamping structure 2 provided by the present disclosure is small in size and can save more internal space of the electronic device.

Continuing to refer to FIGS. 1 to 3, the antenna element 3 includes an opposing first side 31 and second side 32, and an opposing third side 33 and fourth side 34. The first side 31 and the second side 32 are connected between the third side 33 and the fourth side 34. The first side 31 and the second side 32 respectively have a first notch C1 and a second notch C2. Further, the contour size (e.g., length and width) of the first notch C1 is not equal to the contour size of the second notch C2. As shown in FIG. 1, the contour size of the first notch C1 is larger than the contour size of the second notch C2, but the present disclosure is not limited thereto.

As shown in FIG. 2, the antenna element 3 can be fixed on the fixed bracket F by engaging with the first clamping part 21 and the second clamping part 23. When the antenna element 3 is engaged with the first clamping part 21 and the second clamping part 23, the first notch C1 of the antenna element 3 is engaged with the first clamping part 21 (the width of the first notch C1 is equal to the width of the first clamping part 21), and the second notch C2 of the antenna element 3 is engaged with the second retaining wall 24 (the width of the second notch C2 is equal to the width of the second retaining wall 24), so as to achieve horizontal (Y-axis direction) and vertical (Z-axis direction) position limiting. Now, the first clamping part 21 and the second clamping part 23 are located on the first side 31 of the antenna element 3, and the first retaining wall 22 and the second retaining wall 24 are located on the second side 32 of the antenna element 3.

Furthermore, regarding design, the width W21 of the first clamping part 21 is smaller than the width W23 of the second clamping part 23, and the width W22 of the first retaining wall 22 is larger than the width W24 of the second retaining wall 24. Therefore, the present disclosure can also achieve foolproof design through the structure where the widths between the two clamping parts are not equal and the widths between the two retaining walls are not equal; that is, the larger second clamping part 23 cannot fittingly engage the first notch C1, and the larger first retaining wall 22 cannot be fittingly inserted into the second notch C2. Therefore, the antenna element 3 can be assembled on the fixed bracket F in a fixed direction.

As shown in FIG. 3, the end E of each of the first retaining wall 22 and the second retaining wall 24 extends in a direction away from the base 1. Taking the second retaining wall 24 as an example, there is a first distance D1 between the end E of the second retaining wall 24 and a surface 10 of the base 1, where the first distance D1 is the height of the second retaining wall 24. Additionally, the antenna element 3 has a first surface S1 and a second surface S2 located on opposite sides, with a central line CL between the first surface S1 and the second surface S2. When the antenna element 3 is fixed on the fixed bracket F, there is a second distance D2 between the central line CL and the surface 10 of the base 1, and the first distance D1 is greater than or equal to the second distance D2. In other words, when the antenna element 3 is fixed on the fixed bracket F, the height of the first retaining wall 22 and the second retaining wall 24 in the X-axis direction is more than at least half the thickness of the antenna element 3, so as to prevent the antenna element 3 from falling off the clamping structure 2. Note that the thickness of the antenna element 3 is the distance between the first surface S1 and the second surface S2.

Therefore, as shown in FIG. 2, the antenna element 3 is limited in position by the clamping parts and retaining walls on both left and right sides. For example, if the antenna element 3 moves to the left (i.e., moves in the negative Y-axis direction), the first side 31 of the antenna element 3 will be limited by the first clamping part 21 and the second clamping part 23. On the other hand, if the antenna element 3 moves to the right (i.e., moves in the positive Y-axis direction), the second side 32 of the antenna element 3 will be limited by the first retaining wall 22 and the second retaining wall 24.

Figure 4:
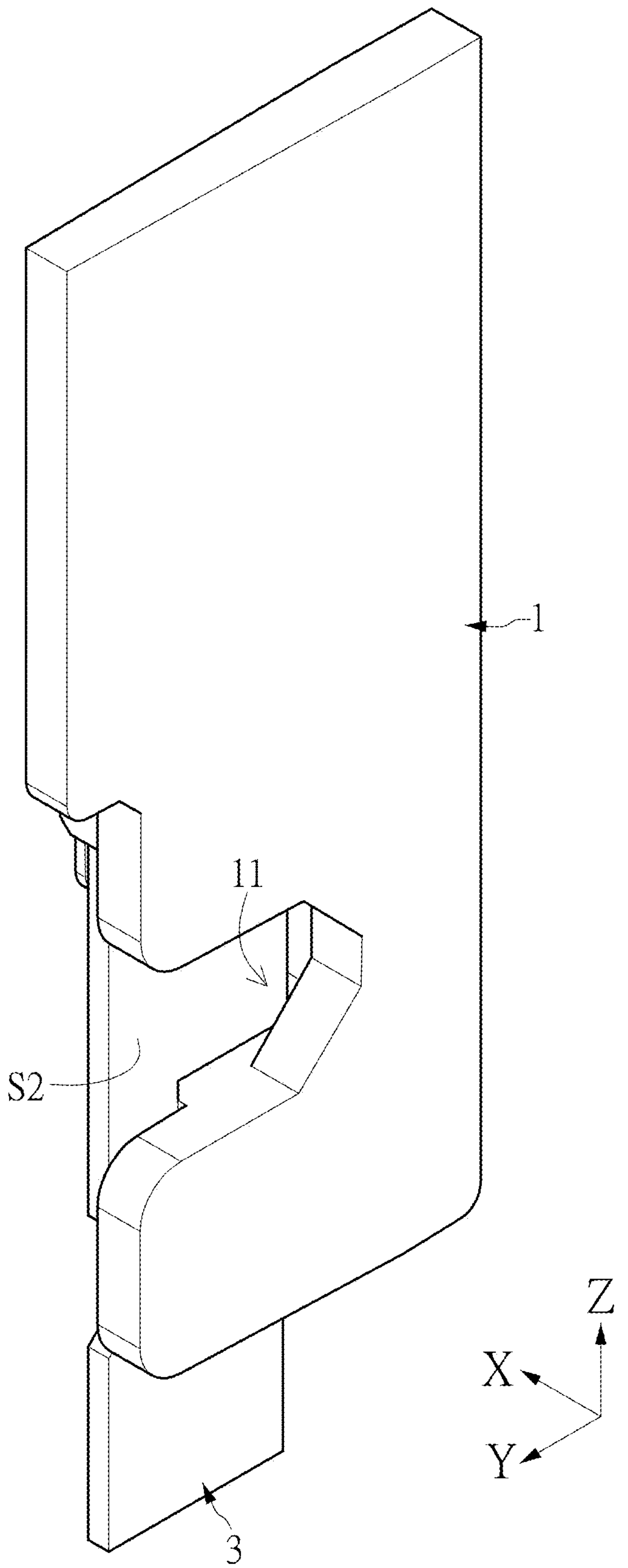
FIG. 4 is a schematic view of the antenna element assembled on the fixed bracket according to the first embodiment of the present disclosure.

Refer to FIGS. 3 and 4, where FIG. 4 is a schematic view of the antenna element assembled on the fixed bracket according to the first embodiment of the present disclosure. The base 1 also has a notch 11. When the antenna element 3 is engaged with the first clamping part 21 and the second clamping part 23, the notch 11 is located between the first clamping part 21 and the second clamping part 23, and the notch 11 is located on the second surface S2 of the antenna element 3. The notch 11 has the functionality of avoiding wires. The antenna element 3 of the present disclosure can be externally connected to a wire (not shown in the drawings), the wire can be connected to the second surface S2 and extend out through the notch 11 for electrical connection to an external mainboard (not shown in the drawings).

Figure 5:
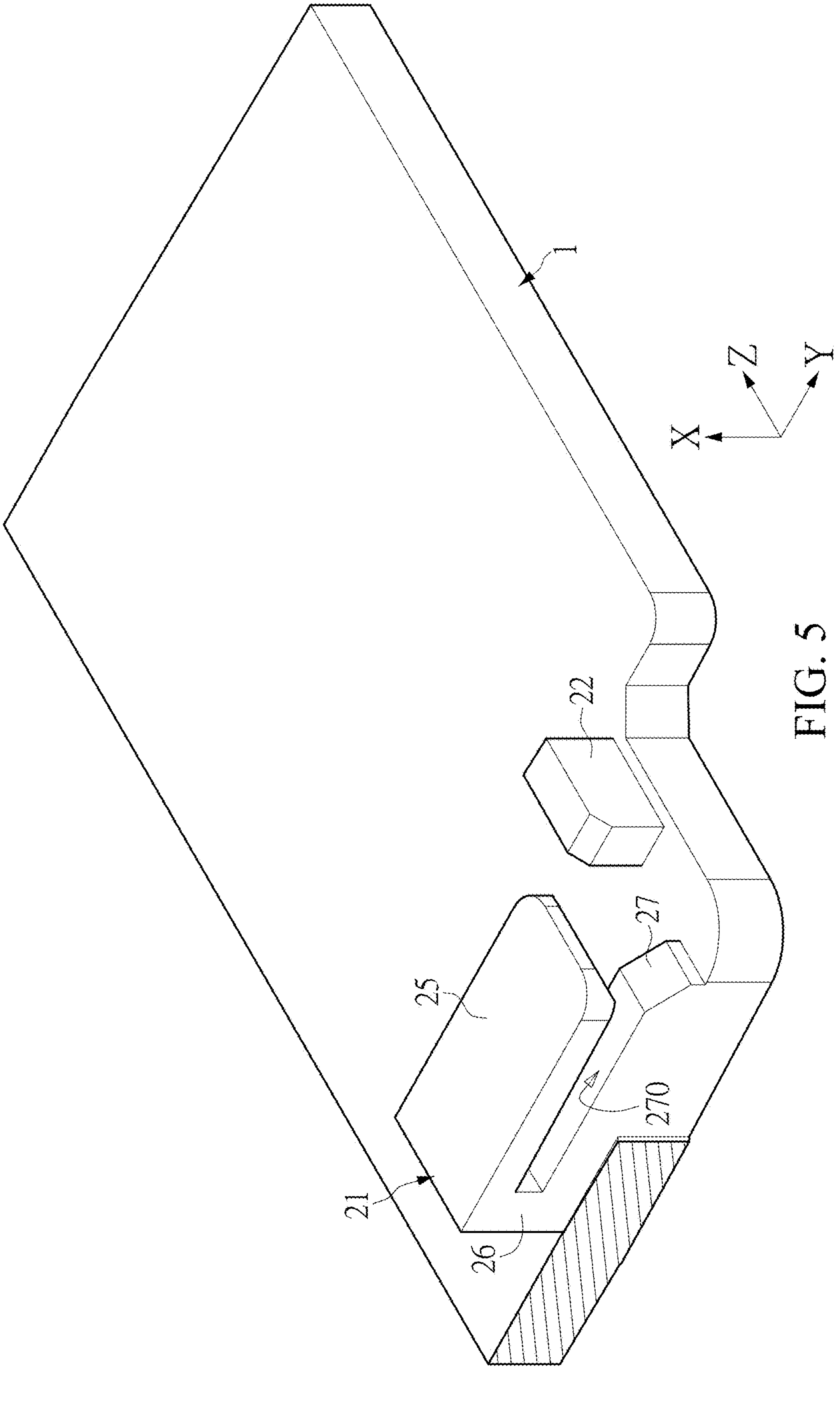
FIG. 5 is a partial schematic view of the fixed bracket according to the first embodiment of the present disclosure.

Refer to FIG. 5, which is a partial schematic view of the fixed bracket according to the first embodiment of the present disclosure. Each of the first clamping part 21 and the second clamping part 23 includes a cantilever 25, a connecting part 26, and a rib 27. The rib 27 is disposed on the base 1, and the connecting part 26 connects the cantilever 25 and the rib 27. Viewed from the positive Z-axis direction, the cantilever 25, the connecting part 26, and the rib 27 together form a U-shaped clamping structure. The antenna element 3 is inserted between the cantilever 25 and the rib 27 (i.e., the opening of the U-shaped clamping structure) to engage with the first clamping part 21 and the second clamping part 23.

Figure 6:
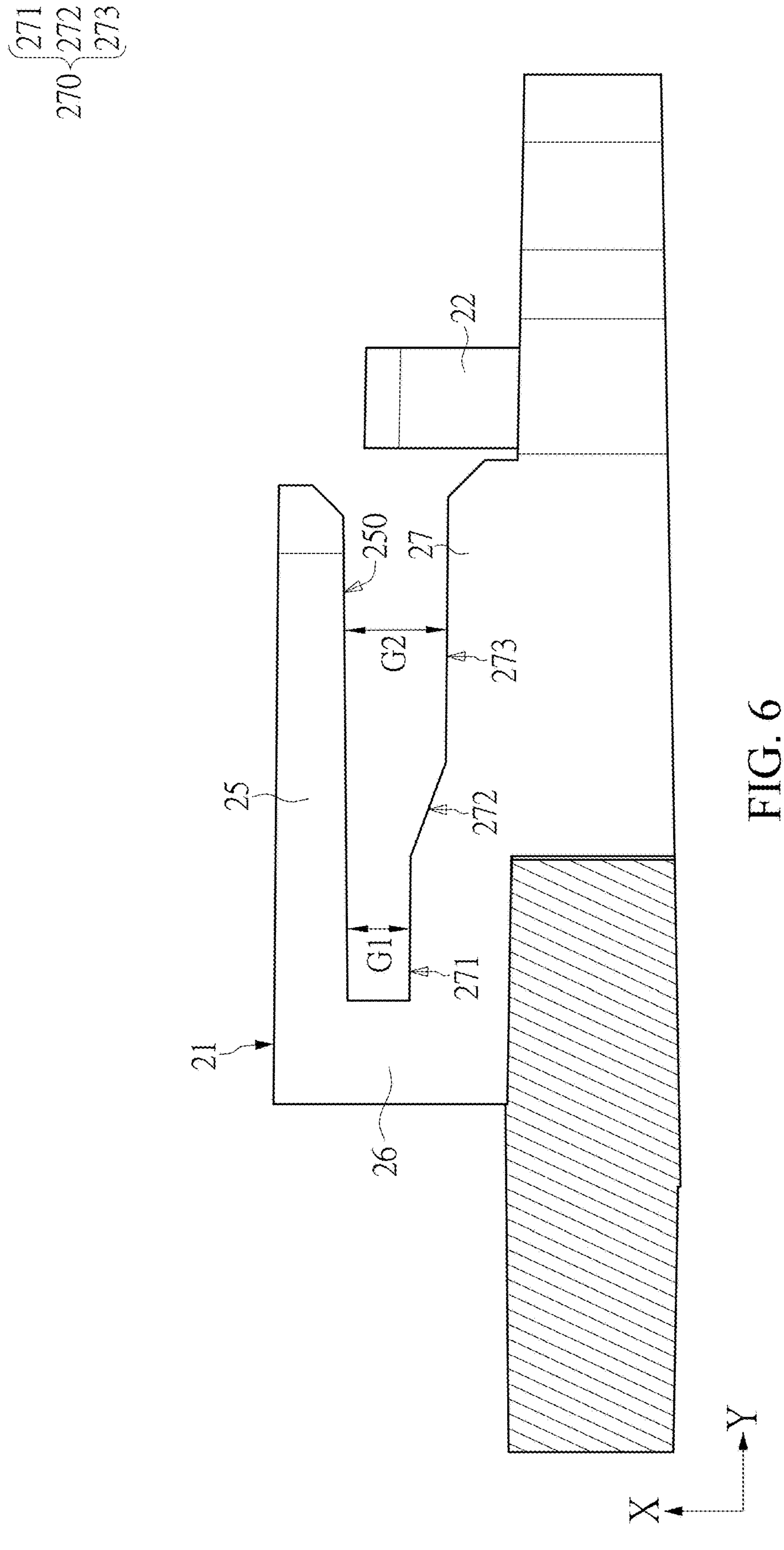
FIG. 6 is a cross-sectional schematic of the fixed bracket according to a second embodiment of the present disclosure.

Additionally, it is worth mentioning that in FIG. 5, the rib 27 has an upper surface 270, and the upper surface 270 is a flat structure, but the present disclosure is not limited thereto. Refer to FIG. 6, which is a cross-sectional schematic view of the fixed bracket according to a second embodiment of the present disclosure. Comparing FIG. 5 and FIG. 6, the upper surface 270 of the rib 27 in FIG. 5 is a flat structure, while the upper surface 270 of the rib 27 in FIG. 6 forms a stepped structure. Specifically, in FIG. 6, the upper surface 270 includes a first step surface 271, an inclined surface 272, and a second step surface 273. The inclined surface 272 is connected between the first step surface 271 and the second step surface 273. The first step surface 271 is connected between the connecting part 26 and the inclined surface 272.

The first step surface 271 and the lower surface 250 of the cantilever 25 are distanced at a first gap G1, and the second step surface 273 and the lower surface 250 of the cantilever 25 are distanced at a second gap G2. The first gap G1 is smaller than the second gap G2. In other words, there is a height difference between the first step surface 271 and the second step surface 273; preferably the height difference (the difference between the first gap G1 and the second gap G2) is at least larger than 0.2 mm.

Figure 7:
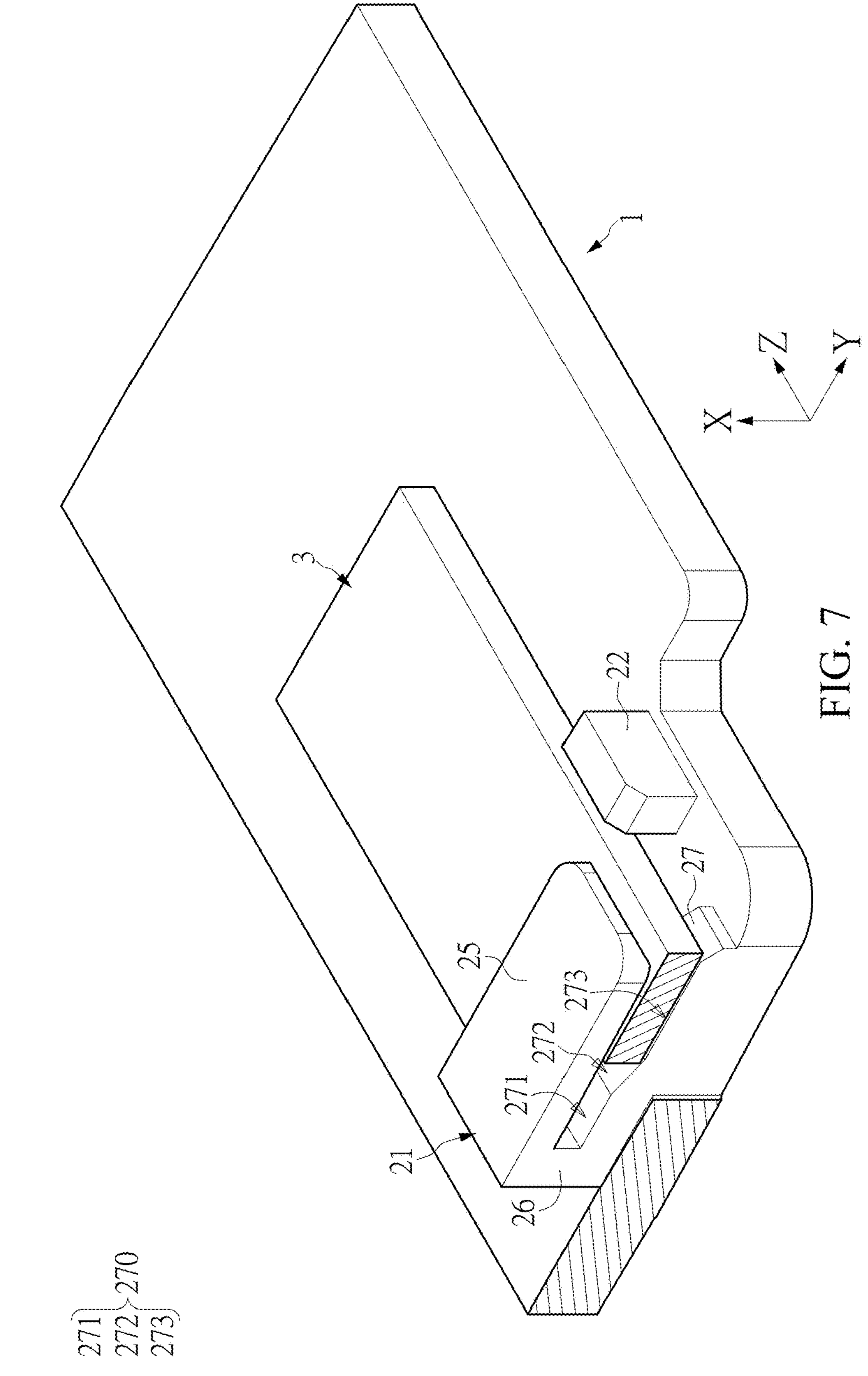
FIGS. 7 to 9 are schematic views of the fixed bracket and the antenna elements with different thicknesses being assembled according to the second embodiment of the present disclosure.
Figure 8:
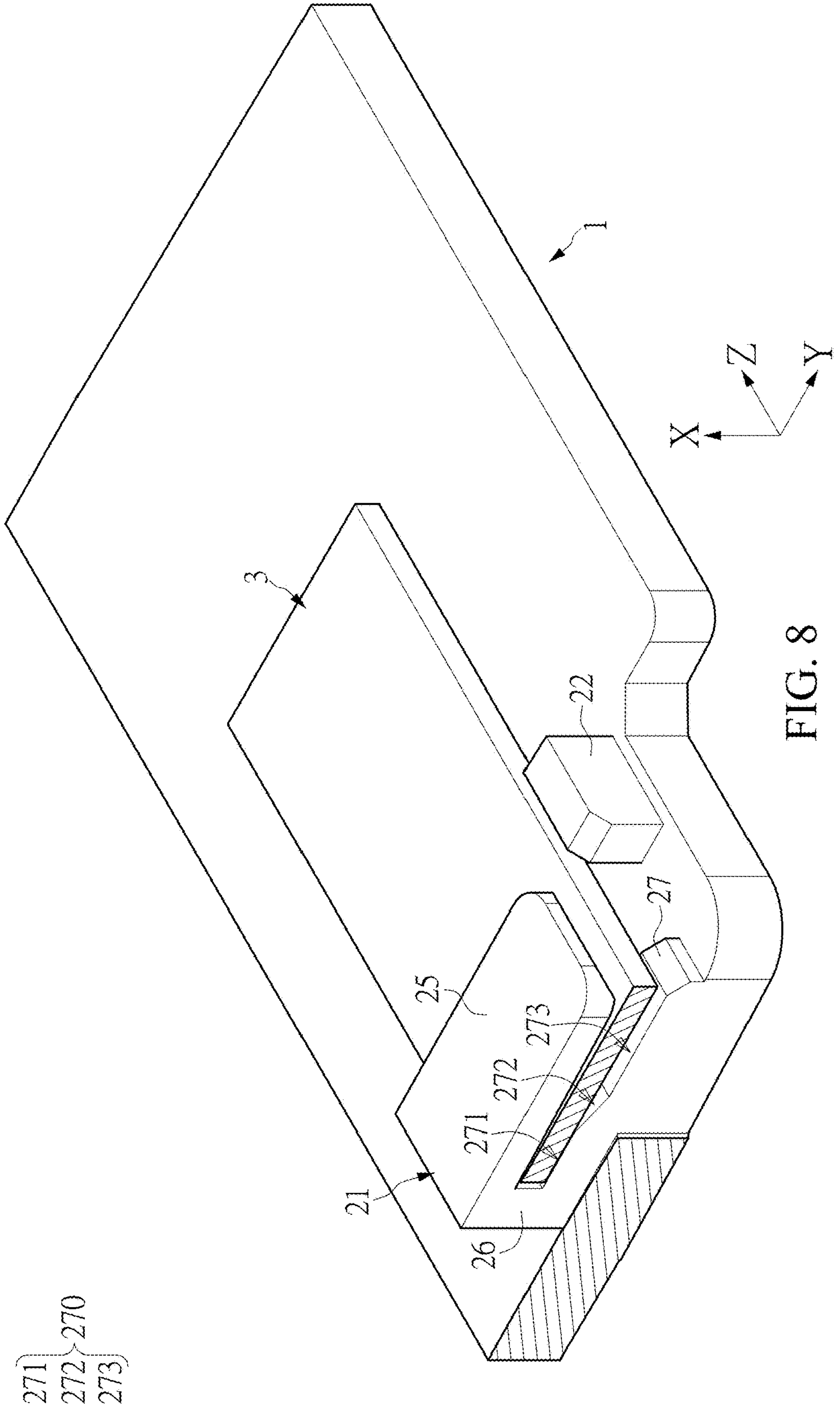
Figure 9:
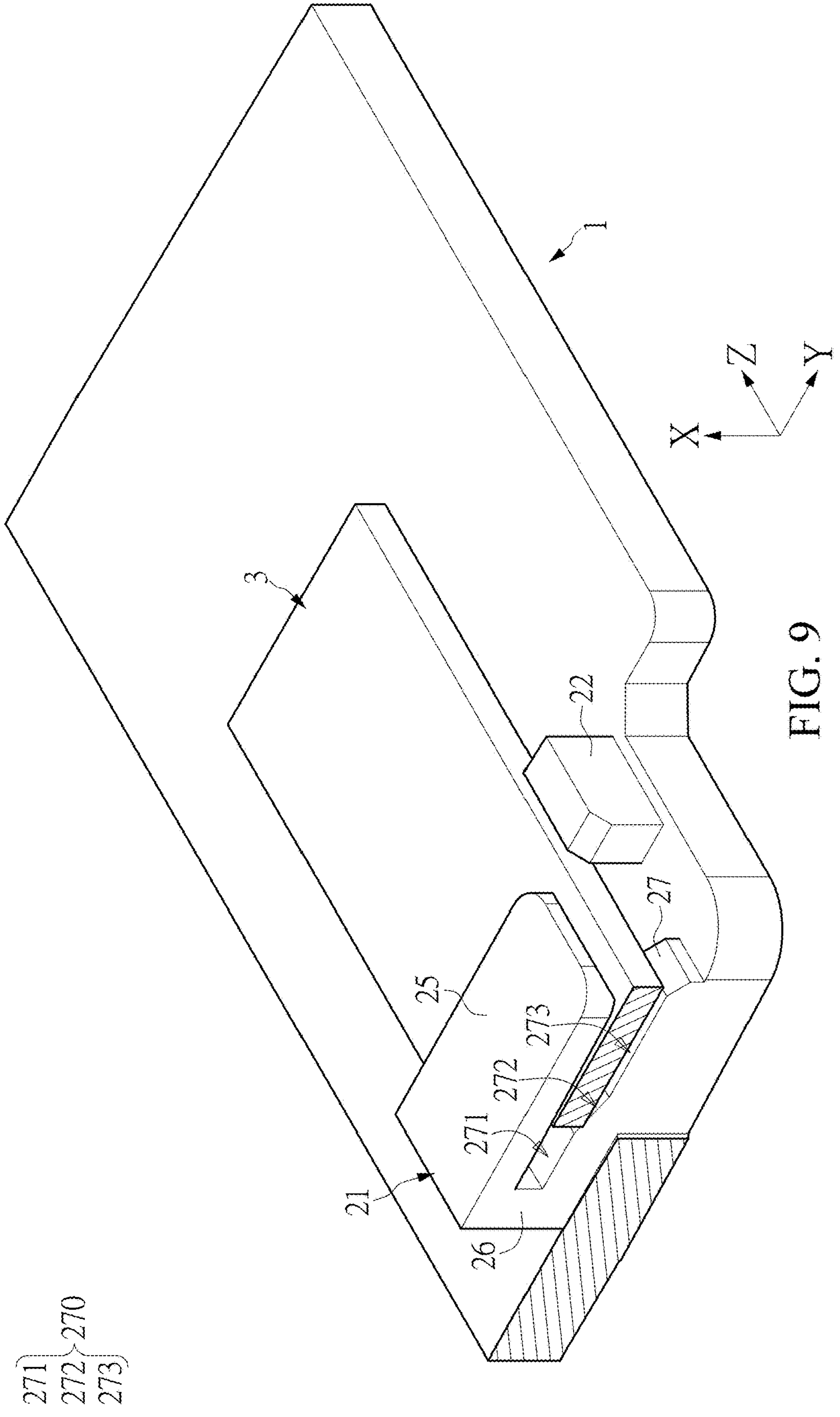

Refer to FIGS. 7 to 9, which are schematic views of the fixed bracket and the antenna elements with different thicknesses assembled according to the second embodiment of the present disclosure. More specifically, FIGS. 7 to 9 illustrate schematic views of the insertion of antenna elements 3 with thicknesses varying from large to small into the first clamping part 21 of FIG. 6. Notably, the size (e.g., depth and width) of the notch (e.g., the first notch C1 of FIG. 1) also changes with the thickness of the antenna element 3; for instance, an antenna 3 with a smaller thickness will have a first notch C1 with a smaller depth. As shown in FIG. 7, when a thicker antenna element 3 is inserted into the first clamping part 21, the antenna element 3 will stop at the position of the second step surface 273. As shown in FIG. 8, when a thinner antenna element 3 is inserted into the first clamping part 21, the antenna element 3 can further insert to the position of the first step surface 271. As shown in FIG. 9, the thickness of the antenna element 3 in FIG. 9 is between the thicknesses of the antenna elements in FIGS. 7 and 8. When the antenna element 3 in FIG. 9 is inserted into the first clamping part 21, the antenna element 3 will stop at the inclined surface 272. Therefore, the present disclosure can accommodate antenna elements 3 of different thicknesses by forming a stepped structure on the upper surface 270 of the rib 27.

Beneficial Effects of the Embodiments

The antenna module M and the fixed bracket F thereof provided by the present disclosure can fix the antenna element 3 through clamping parts and retaining walls with simple structures. Furthermore, the antenna element 3 is clamped onto the first clamping part 21 on the fixed bracket F through the first notch C1, and is clamped onto the second retaining wall 24 of the fixed bracket F through the second notch C2, so as to achieve position limiting in the horizontal direction (Y-axis direction) and vertical direction (Z-axis direction).

Furthermore, the present disclosure also employs a staggered configuration between the first clamping part 21 and the second clamping part 23, as well as a staggered configuration between the first retaining wall 22 and the second retaining wall 24, to act as a foolproof design, allowing the antenna element 3 to be assembled onto the fixed bracket F in a fixed direction.

In prior art, the size of the hook structure used to fix objects generally needs to account for 80% or more of the object size to achieve stable clamping. The present disclosure can effectively stabilize the clamping of the antenna element 3 by designing the maximum distance between any two of the two clamping parts and the two retaining walls to account for at least 55% of the maximum length of the antenna element 3. Furthermore, compared to the existing hook structure, the clamping structure 2 provided by the present disclosure is small in size and can save more internal space of the electronic device.

The foregoing description of the exemplary embodiments of the present disclosure has been presented only for the purposes of illustration and description and is not intended to be exhaustive or to limit the present disclosure to the precise forms disclosed. Many modifications and variations are possible in light of the above teaching. Any equivalent structural or procedural changes made by those skilled in the art using the contents of the present disclosure should fall within the scope of the present disclosure.

What is claimed is:

1. An antenna module, comprising:

a fixed bracket, comprising a base and a clamping structure disposed on the base, the clamping structure comprising:

a first clamping part;

a first retaining wall adjacent to the first clamping part;

a second clamping part; and a second retaining wall adjacent to the second clamping part;

wherein the first clamping part and the second clamping part are arranged along a straight line, a horizontal distance between the first clamping part and the straight line is not equal to a horizontal distance between the second clamping part and the straight line, and a horizontal distance between the first retaining wall and the straight line is not equal to a horizontal distance between the second retaining wall and the straight line; and an antenna element, detachably engaged with the first clamping part and the second clamping part.

2. The antenna module according to claim 1, wherein a difference between the horizontal distance between the first clamping part and the straight line and the horizontal distance between the second clamping part and the straight line is at least 0.5 mm, and a difference between the horizontal distance between the first retaining wall and the straight line and the horizontal distance between the second retaining wall and the straight line is at least 0.5 mm.

3. The antenna module according to claim 1, wherein the antenna element comprises opposing first and second sides, and opposing third and fourth sides, the first side and the second side connected between the third side and the fourth side, and the first side and the second side respectively having a first notch and a second notch; wherein, when the antenna element is engaged with the first clamping part and the second clamping part, the first notch of the antenna element is engaged with the first clamping part, and the second notch of the antenna element is engaged with the second retaining wall.

4. The antenna module according to claim 3, wherein a contour size of the first notch is not equal to a contour size of the second notch.

5. The antenna module according to claim 3, wherein a maximum distance between any two of the first clamping part, the second clamping part, the first retaining wall, and the second retaining wall at least accounts for 55% of a maximum distance between the third side and the fourth side of the antenna element.

6. The antenna module according to claim 1, wherein each of the first clamping part and the second clamping part comprises a cantilever, a connecting part, and a rib, the rib being disposed on the base, and the connecting part connects the cantilever and the rib.

7. The antenna module according to claim 6, wherein the rib has an upper surface, the upper surface comprising a first step surface, an inclined surface, and a second step surface, the inclined surface being connected between the first step surface and the second step surface, and the first step surface being connected between the connecting part and the inclined surface.

8. The antenna module according to claim 7, wherein the first step surface and a lower surface of the cantilever are distanced at a first gap, the second step surface and the lower surface of the cantilever are distanced at a second gap, the first gap being smaller than the second gap.

9. The antenna module according to claim 1, wherein the base has a recess located between the first clamping part and the second clamping part.

10. The antenna module according to claim 1, wherein a height of each of the first retaining wall and the second retaining wall is at least larger than half of a thickness of the antenna element.

11. A fixed bracket, comprising:

a base; and a clamping structure disposed on the base, the clamping structure comprising:

a first clamping part;

a first retaining wall adjacent to the first clamping part;

a second clamping part; and a second retaining wall adjacent to the second clamping part;

wherein the first clamping part and the second clamping part are arranged along a straight line, a horizontal distance between the first clamping part and the straight line is not equal to a horizontal distance between the second clamping part and the straight line, and a horizontal distance between the first retaining wall and the straight line is not equal to a horizontal distance between the second retaining wall and the straight line.

12. The fixed bracket according to claim 11, wherein a difference between the horizontal distance between the first clamping part and the straight line and the horizontal distance between the second clamping part and the straight line is at least 0.5 mm, and a difference between the horizontal distance between the first retaining wall and the straight line and the horizontal distance between the second retaining wall and the straight line is at least 0.5 mm.

13. The fixed bracket according to claim 11, wherein each of the first clamping part and the second clamping part comprises a cantilever, a connecting part, and a rib, the rib being disposed on the base, and the connecting part connects the cantilever and the rib.

14. The fixed bracket according to claim 13, wherein the rib has an upper surface, the upper surface comprising a first step surface, an inclined surface, and a second step surface, the inclined surface being connected between the first step surface and the second step surface, and the first step surface being connected between the connecting part and the inclined surface.

15. The fixed bracket according to claim 14, wherein the first step surface and a lower surface of the cantilever are distanced at a first gap, the second step surface and the lower surface of the cantilever are distanced at a secondgap, the first gap being smaller than the second gap.

* * * * *